United States Patent [19]
Yamanashi

[11] Patent Number: 6,094,313
[45] Date of Patent: Jul. 25, 2000

[54] ZOOM LENS SYSTEM

[75] Inventor: Takanori Yamanashi, Kokubunji, Japan

[73] Assignee: Olympus Optical Co., Ltd., Tokyo, Japan

[21] Appl. No.: 09/185,730

[22] Filed: Nov. 4, 1998

[30]     Foreign Application Priority Data

Nov. 6, 1997  [JP]  Japan ..................................... 9-304159

[51] Int. Cl.⁷ ............................. G02B 15/14; G02B 15/22
[52] U.S. Cl. ........................... 359/686; 359/693; 359/676
[58] Field of Search .................................. 359/676, 683, 359/685, 686, 693

[56]             References Cited

U.S. PATENT DOCUMENTS

| | | | |
|---|---|---|---|
| 4,178,076 | 12/1979 | Tsuji et al. ............................... | 350/184 |
| 4,256,371 | 3/1981 | Someya .................................... | 350/423 |
| 4,711,534 | 12/1987 | Matsushita et al. ..................... | 350/426 |
| 4,822,152 | 4/1989 | Yamanashi .............................. | 350/427 |
| 4,830,477 | 5/1989 | Takahashi et al. ...................... | 350/428 |
| 4,865,434 | 9/1989 | Matsushita et al. ..................... | 350/430 |
| 5,105,311 | 4/1992 | Tokumara et al. ....................... | 359/686 |
| 5,159,494 | 10/1992 | Yamanashi .............................. | 359/689 |
| 5,170,292 | 12/1992 | Yamanashi .............................. | 359/686 |
| 5,194,991 | 3/1993 | Yamanashi .............................. | 359/693 |

FOREIGN PATENT DOCUMENTS 4-303809  10/1992  Japan .

*Primary Examiner*—Georgia Epps
*Assistant Examiner*—David N. Spector
*Attorney, Agent, or Firm*—Pillsbury Madison & Sutro LLP

[57]             ABSTRACT

The invention relates to a zoom lens system having stable performance and a high magnification, which comprises a first lens group G1 having positive refracting power, a second lens group G2 having negative refracting power, a third lens group G3 having positive refracting power and a fourth lens group G4 having negative refracting power. For zooming from a wide-angle end to a telephoto end of a zooming area having a continuous zooming action, an intergroup space of each lens group is varied. At least one group of the four lens groups is moved to define an extended wide-angle point SW that is a discontinuous zooming point at a position where a focal length thereof becomes shorter than the wide-angle end of the zooming area. At least one lens group of the four lens groups is moved to define an extended telephoto point ST that is a discontinuous zooming point at a position where a focal length thereof becomes longer than the telephoto end of the zooming area.

31 Claims, 9 Drawing Sheets

ZOOM LENS SYSTEM

BACKGROUND OF THE INVENTION

The present invention relates generally to a zoom lens system, and more particularly to a high-magnification zoom lens system used with compact cameras.

In the development of zoom lenses for compact cameras, there is growing demand for achieving a much higher zoom ratio equal to that of an interchangeable lens for single-lens reflex cameras. As already proposed by the inventors, a high-magnification zoom lens system which comprises three lens groups, positive, positive and negative, and is a development of a four-group zoom type having a positive-negative-positive-negative power profile in order from an object side thereof can achieve a zoom ratio exceeding 4. In this zoom lens system, the final lens group having negative refracting power takes part in the zooming action. For zooming, the final lens group moves in association with other lens groups. However, this zoom lens system is practically less acceptable because some problems still remain unsolved, e.g., a problem regarding the amounts of movement of lens groups during zooming, a decentration error problem, and a sensitivity problem during focusing. In JP-A 4-303809, the inventors have proposed to provide an extension of a wide-angle side by varying spaces between lens groups at a wide-angle end, thereby achieving an ever higher magnification. In JP-A 3-31809, the inventors have also proposed to provide an extension of a telephoto side by varying spaces between lens groups at a telephoto end.

However, these inventions have for their object to extend a field angle with respect to a zoom lens, and so have no direct relation to a zoom lens having a high zoom ratio or an optical system involving an extending method.

SUMMARY OF THE INVENTION

The present invention has been accomplished as a result of studies made of zoom lens modes, efficient utilization of aspherical surfaces, focusing modes, and lens arrangements so as to achieve high magnifications for optical systems having a short back focus such as a zoom lens system for compact cameras, and has for its object to provide a zoom lens system that has a high magnification while stable performance is well maintained.

According to one aspect of the invention, the aforesaid object is achieved by the provision of a zoom lens system comprising at least a first lens group having positive refracting power, a second lens group that is located nearer to an image side of the system than the first lens group and has negative refracting power, a third lens group that is located nearer to the image side than the second lens group and has positive refracting power and a fourth lens group that is located nearer to the image side than the third lens group and has negative refracting power, characterized in that:

for zooming from a wide-angle end to a telephoto end of a zooming area having a continuous zooming action, an intergroup space of each lens group is varied, and at least one group of the four lens groups is moved to define an extended wide-angle point that is a discontinuous zooming point at a position where a focal length of the system becomes shorter than the wide-angle end of the zooming area while at least one lens group of the four lens groups is moved to define an extended telephoto point that is a discontinuous zooming point at a position where the focal length becomes longer than the telephoto end of the zooming area.

According to another aspect of the invention, there is provided a zoom lens system comprising at least a first lens group having positive refracting power, a second lens group that is located nearer to an image side of the system than the first lens group and has negative refracting power, a third lens group that is located nearer to the image side than the second lens group and has positive refracting power and a fourth lens group that is located nearer to the image side than the third lens group and has negative refracting power, characterized in that:

an intergroup space of at least one lens group of the four lens groups is varied for zooming, and a magnification ratio between a zooming point located nearest to a wide-angle side of the system and a zooming point located nearest to a telephoto side of the system in a zooming range of the system is at least 5.

According to yet another aspect of the invention, there is provided a zoom lens system comprising, in order from an object side of the system, a first lens group having positive refracting power, a second lens group having negative refracting power, a third lens group having positive refracting power and a fourth lens group having negative refracting power, characterized in that:

for zooming a wide-angle end to a telephoto end of the system, each lens group moves toward the object side with respect to the wide-angle end, the first lens group comprises at least one doublet consisting of a negative lens and a positive lens, the second lens group comprises at least one doublet consisting of a negative lens and a positive lens, the third lens group comprises a positive lens, a doublet consisting of a negative lens and a positive lens and a positive lens and has at least one aspherical surface therein, and the fourth lens group comprises at least a negative lens and a positive lens and has at least one aspherical surface therein, and said zoom lens system satisfies the following conditions:

$$\nu_{P3} > 50 \tag{1}$$

$$2 < m_{4T}/m_{4W} < 6 \tag{2}$$

wherein $\nu_{P3}$ is an average value of an Abbe's number of the positive lens in the third lens group, $m_{4T}$ is a transverse magnification of the fourth lens group at the telephoto end, and $m_{4W}$ is a transverse magnification of the fourth lens group at the wide-angle end.

According to a further aspect of the invention, there is provided a zoom lens system comprising, in order from an object side of the system, a first lens group having positive refracting power, a second lens group having negative refracting power, a third lens group having positive refracting power and a fourth lens group having negative refracting power, characterized in that:

for zooming from a wide-angle end to a telephoto end of the system, each lens group moves toward the object side, and a focal length shorter than the wide-angle end is obtained by varying at least two of zooming spaces $D_{1W}$, $D_{2W}$ and $D_{3W}$ while a focal length longer than the telephoto end is obtained by varying at least two of zooming spaces $D_{1T}$, $D_{2T}$ and $D_{3T}$, wherein $D_{1W}$ is a first zooming space at the wide-angle end, $D_{2W}$ is a second zooming space at the wide-angle end, $D_{3W}$ is a third zooming space at the wide-angle end, $D_{1T}$ is a first zooming space at the telephoto end, $D_{2T}$ is a second zooming space at the telephoto end, and $D_{3T}$ is a third zooming space at the telephoto end.

Why the aforesaid arrangements are adopted, and how they work will now be explained.

In JP-A 4-303809 or the like, the inventors have already taught that a high-magnification zoom lens system can be achieved by allowing $m_{4T}/m_{4W}$, where $m_{4T}$ is a paraxial transverse magnification of the fourth lens group at the telephoto end and $m_{4W}$ is a paraxial transverse magnification of the fourth lens group at the wide-angle end, to have a large value. The total length of the system may become long depending on the amounts of movement of lens groups during zooming and the overall length of the system at the wide-angle end. When the number of constituting lenses decreases or the power of each lens group increases, there is a performance drop. This drop may be compensated for by use of aspherical surfaces, GRIN lenses or DOE optical elements. In the present invention, however, it is rather essential that a basic lens arrangement be laid out according to optical system requirements.

To make the zoom ratio high, the following zoom lens type having a high degree of freedom including correction of field curvature aberration occurring in association with zooming is chosen in the present invention. That is, a specific zoom lens type is chosen in the present invention, which, as proposed in JP-A 8-30783, comprises, in order from an object side thereof, a first lens group having positive refracting power, a second lens group having negative refracting power, a third lens group having positive refracting power and a fourth lens group having negative refracting power, and in which, for zooming from a wide-angle end to a telephoto end of the system, each lens group moves toward the object side with respect to the wide-angle end.

Referring here to a zoom lens system that is used with a single-lens reflex camera, and has a positive-negative-positive-positive or positive-negative-positive-negative power profile in order from an object side of the system, a field curvature fluctuation is generally corrected by separate movement of the third and fourth lens groups. This is also true of a high-magnification zoom lens system. For a zoom lens system having an increasing zoom ratio, it is known that the field curvature fluctuation is corrected by dividing the third and fourth lens groups into sub-groups. In a zoom lens system comprising a positive lens group, a negative lens group, a positive lens group and a negative lens group in order from an object side thereof, as proposed by the inventors, on the other hand, the fourth lens group shares a large part of zooming action while the field curvature fluctuation is corrected by movement of the second and third lens groups. A three-group zoom lens system comprising a positive lens group, a positive lens group and a negative lens group in order from an object side of the system has a high capability of correcting aberrations, especially when the second lens group is made up of a negative front sub-group and a positive rear sub-group. However, the four-group zoom lens system is superior to the three-group zoom lens system in view of the total length of the system at the telephoto end because the total length of the second lens group becomes long. Thus, the four-group lens system is favorable for a high-magnification zoom lens system. In other words, the four-group zoom lens system is best suited for an optical system having an increasing zoom ratio such as one contemplated in the present invention.

In order to achieve a high zoom ratio according to the present invention, at least chromatic aberrations should be corrected at each lens group. Assume here that the optical element is made up of a homogeneous medium. Then, the minimal constituting unit comprises a positive lens and a negative lens. If a GRIN (gradient-index lens) or a DOE (diffractive optical element), each capable of correcting chromatic aberrations, is used, it is then understood that the potential capability of correcting chromatic aberrations is enhanced.

The capability of correcting aberrations is much more improved if the first lens group comprises at least one set of doublet consisting of a negative lens and a positive lens, with the positive lens divided into two parts. This prevents the amount of movement of the first lens group from being smaller than required, resulting in an increase in the amount of movement of the first lens group during zooming. When the telephoto end reaches a telephoto range, it is possible to use an anomalous dispersion glass for the positive lens, thereby increasing the aperture ratio on the telephoto side.

To take the Abbe's number of the positive lens in the first lens group into consideration is important for correction of chromatic aberrations that become significantly noticeable on the telephoto side in particular.

Usually, the second lens group comprises a doublet consisting of a negative lens and a positive lens. On the wide-angle side, the first and second lens groups, whose composite refracting force becomes negative, share a substantial part of diverging action, and take a great role in obtaining a sufficient back focus at the wide-angle end. In addition, the action of the negative lens makes an effective contribution to correction of astigmatism on the wide-angle side. The second lens group may be made up of a cemented doublet or an air-spaced doublet, each consisting of a negative lens and a positive lens. The cemented doublet is effective for correction of off-axis aberrations, if an aspherical surface is incorporated therein.

Usually, the third lens group is preferably made up of a positive lens, and a cemented doublet consisting of a positive lens and a negative lens. The positive lens may be dispensed with if an aspherical surface is used in combination with the doublet. To achieve a high zoom ratio in this case, it is preferable to locate the positive lens at a position nearest to the image side or the like. This is expected to be effective for correction of off-axis coma in particular.

The third lens group has a final surface concentric in shape with respect to the aperture stop. If an aspherical surface is used for this final surface, a noticeable effect is then expected on correction of coma. If an aspherical surface is used at a position located on the object side of the positive lens and near to the aperture stop, it is then easy to make correction for axial longitudinal spherical aberration, and so achieve a large aperture ratio effectively.

The following condition is greatly effective for correction of off-axis chromatic aberrations on the telephoto side.

$$\nu_{P3} > 50 \quad (1)$$

Here $\nu_{P3}$ is a countable mean value of an Abbe's number of the positive lens element at a reference wavelength d-line, which lens element is used in the third lens group. A choice of glass deviating from condition (1) is contrary to the purport of the invention and so is not preferable, because the zoom ratio drops with a decrease in the aperture ratio.

Usually, the fourth lens group comprises a positive lens convex on an image side thereof and a negative lens (a meniscus or double-concave lens). In a special case, the fourth lens group, because of having negative power, may comprise one negative lens with or without an achromatic lens having small power. The fourth lens group acts basically to make correction for field curvature, and has a predetermined thick lens shape so as to make the image plane in the wide-angle range flat. By use of an aspherical surface in the fourth lens group, it is possible to improve its ability to form images on the periphery of the picture plane.

$$2 < m_{4T}/m_{4W} < 6 \quad (2)$$

The zoom lens system of the invention is used in a range that complies with condition (2) given above. This condition is basically provided for the determination of the zoom ratio. Here $m_{4T}$ is the transverse magnification of the fourth lens group at the telephoto end, and $m_{4W}$ is the transverse magnification of the fourth lens group at the wide-angle end. In actual applications, this ratio should be at least about 3. Exceeding the upper limit of 6 in condition (2), however, is unreasonable in view of the mechanical construction of the optical system, because the sensitivity of the optical system to production errors becomes far too high and, at the same time, the amounts of movement of the lens groups during zooming become very large. Falling below the lower limit of 2 is not preferred because of being contrary to the object of the present invention to achieve a high zoom ratio.

The zoom lens system of the present invention is characterized in that a focal length shorter than the wide-angle end is obtained by varying zooming spaces $D_{1W}$, $D_{2W}$ and $D_{3W}$ discontinuously with respect to the wide-angle end position, and a focal length longer than the telephoto end is obtained by varying zooming spaces $D_{1T}$, $D_{2T}$ and $D_{3T}$ discontinuously. In other words, a focal position or extended wide-angle position is located at a site beyond the wide-angle end apart from the zooming range wherein the zoom lens system functions in much the same manner as an ordinary zoom lens.

This is achievable by varying the first zooming space $D_{1W}$, the second zooming space $D_{2W}$ or the third zooming space $D_{3W}$. Now the demand for a wide-angle shot is growing. However, the features of an optical system designed as an ordinary zoom lens system are often governed by wide-angle end design so that the idea of additionally extending the wide-angle range may give birth to a new function.

The zoom lens system of the present invention is again characterized in that the focal length longer than the telephoto end can be obtained by varying the first zooming space $D_{1T}$, the second zooming space $D_{2T}$ or the third zooming space $D_{3T}$. On the telephoto side in particular, the focal length can be extended even with a slight space variation because the sensitivity of the third zooming space $D_{3T}$ to magnification is high. It is here understood that the aperture stop diameter between the wide-angle end and the telephoto end is kept invariable.

That is, $$m_{SW} < m_W \quad (3)$$

$$m_T < m_{ST} \quad (4)$$

It is here to be noted that f is a focal length of the zoom lens system, $f_1$ a focal length of the first lens group, $m_I$ defined by $f=f_1 \times m_I$ is a magnification at the focal length f, $m_W$ is a magnification at the wide-angle end, $m_{SW}$ is a magnification at the extended wide-angle end, and $m_{ST}$ is a magnification at the extended telephoto end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In what follows, Examples 1 to 4 of the zoom lens system according to the invention are given. Sectional schematics of Examples 1 to 4 at their respective intermediate focal lengths are shown in FIGS. 1 to 4. Numerical data regarding each example will be given later. The relative positions of the lens groups in Examples 1 to 4 are illustrated in FIGS. 5 to 8, wherein SW and ST represent an extended wide-angle end and an extended telephoto end, respectively.

Figure 1:
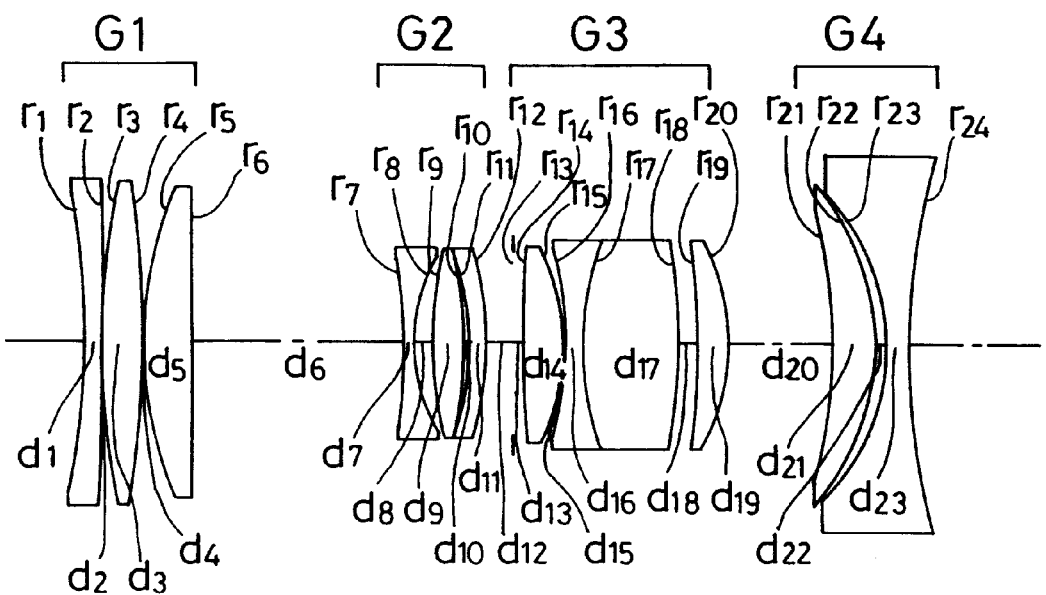
FIG. 1 is a sectional schematic of Example 1 of the zoom lens system of the invention at an intermediate focal length thereof.

Example 1 is directed to a high-magnification zoom lens system having a focal length of 38.9 to 176.2 and an F-number of 4.51 to 8.5. As illustrated in FIG. 1, the system is made up of a first positive lens group G1, a second negative lens group G2, a third positive lens group G3, and a fourth negative lens group G4. The first lens group G1 is made up of a negative meniscus lens concave on an object side thereof and two double-convex lenses, and the second lens group G2 is made up of a double-concave lens, a double-convex lens and a negative meniscus lens convex on an image plane side thereof. The third lens group G3 is made up of an aperture stop, a double-convex lens, a doublet consisting of a double-concave lens and a double-convex lens and a positive meniscus lens convex on an image plane side thereof, and the fourth lens group G4 is made up of a positive meniscus lens convex on an image plane side thereof and a double-concave lens. Three aspherical surfaces are used, one for a surface of the double-convex lens in the third lens group G3, which surface is proximate to the aperture stop and located on the image plane side, one for a surface of the doublet in the third lens group G3, which surface is located nearest to the image plane side, and one for a surface of the double-concave lens in the fourth lens group G4, which surface is located on an object side thereof. For continuous zooming from a wide-angle end to a telephoto end of the system via an intermediate focal length thereof, the lens groups G1 to G4 move toward the object side of the system, as can be seen from the numerical data, given later, and illustrated in FIG. 5. At an extended wide-angle end SW, a focal length of 36.55 and an F-number of 4.38 are achieved by narrowing a first zooming space $d_6$ and widening a third zooming space $d_{20}$ from a wide-angle end position of the system. At an extended telephoto end ST, a focal length range represented by a focal length of 200.15 and an F-number of 9.63 and unachievable so far in the art are obtained by narrowing the first zooming space $d_6$ and widening a second zooming space $d_{12}$ and the third zooming space $d_{20}$ from a telephoto end position of the system. Thus, such a focal length range is not achieved in this class of zoom lens system. FIGS. 9 to 13 are aberration diagrams of Example 1 at its wide-angle end, intermediate focal length, telephoto end, extended wide-angle end, and extended telephoto end, respectively, with (a), (b) and (c) showing spherical aberration, astigmatism and distortion, respectively. Example 1 may be regarded as a wide-aperture, high-magnification zoom lens system in the category of compact cameras.

Figure 2:
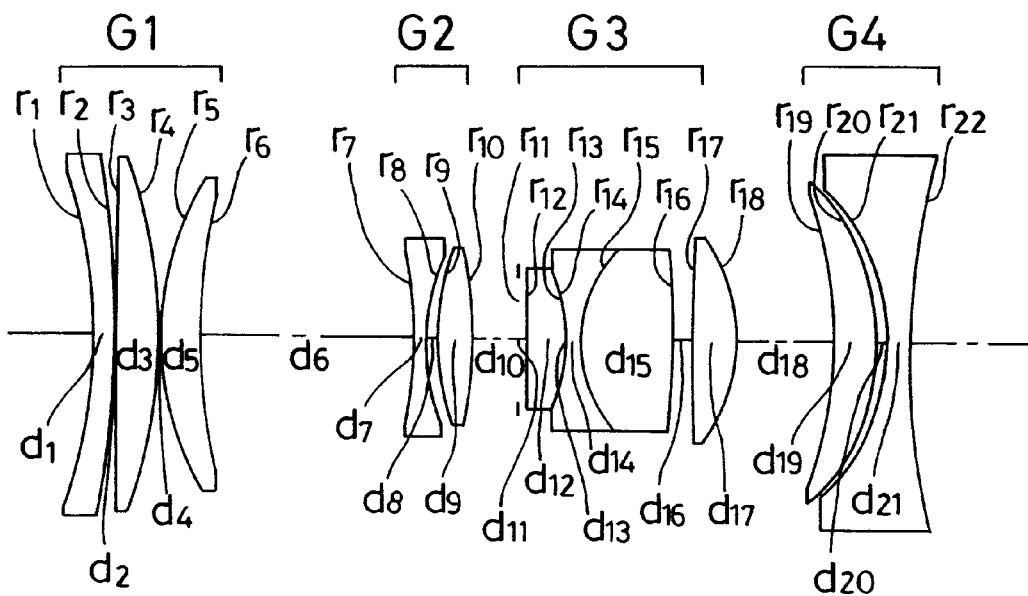
FIG. 2 is a sectional schematic of Example 2 of the zoom lens system of the invention at an intermediate focal length thereof.

Example 2 is directed to a zoom lens system having a focal length of 38.9 to 176.18 and an F-number of 3.64 to 11.18. As illustrated in FIG. 2, the zoom lens system is made up of a first positive lens group G1, a second negative lens group G2, a third positive lens group G3 and a fourth negative lens group G4. The first lens group G1 is made up of a negative meniscus lens concave on an object side thereof, a double-convex lens and a positive meniscus lens convex on an object side thereof, and the second lens group G2 is made up of a double-concave lens and a double-convex lens. The third lens group G3 is made up of an aperture stop, a double-convex lens, a doublet consisting of a double-concave lens and a double-convex lens, and a double-convex lens. The fourth lens group G4 is made up of a positive meniscus lens convex on an image plane side thereof and a double-concave lens. Four aspherical surfaces are used, one for a surface in the second lens group G2, which surface is located nearest to an image plane side thereof, one for a surface of the double-convex lens in the third lens group G3, which surface is proximate to the aperture stop and located on an image plane side thereof, one for a surface of the doublet in the third lens group G3, which surface is located nearest to the image plane side, and one for a surface of the double-concave lens in the fourth lens group G4, which surface is located on an object side thereof. For continuous zooming from a wide-angle end to a telephoto end via an intermediate focal length of the system, the lens groups G1 to G4 move toward the object side, as can be seen from the numerical data, given later, and FIG. 6. At an extended wide-angle end SW, a focal length of 36.55 and an F-number of 3.52 are obtained by narrowing a first zooming space $d_6$ and widening a third zooming space $d_{18}$ from a wide-angle end position of the system. At an extended telephoto end ST, a focal length of 200.15 and an F-number of 12.61 are obtained by widening the first zooming space $d_6$ and narrowing a second zooming space $d_{10}$ and the third zooming space $d_{18}$ from a telephoto end position. In this example, the negative lens used in the second lens group G2 of Example 1 and located nearest to an image plane side thereof is dispensed with.

Figure 3:
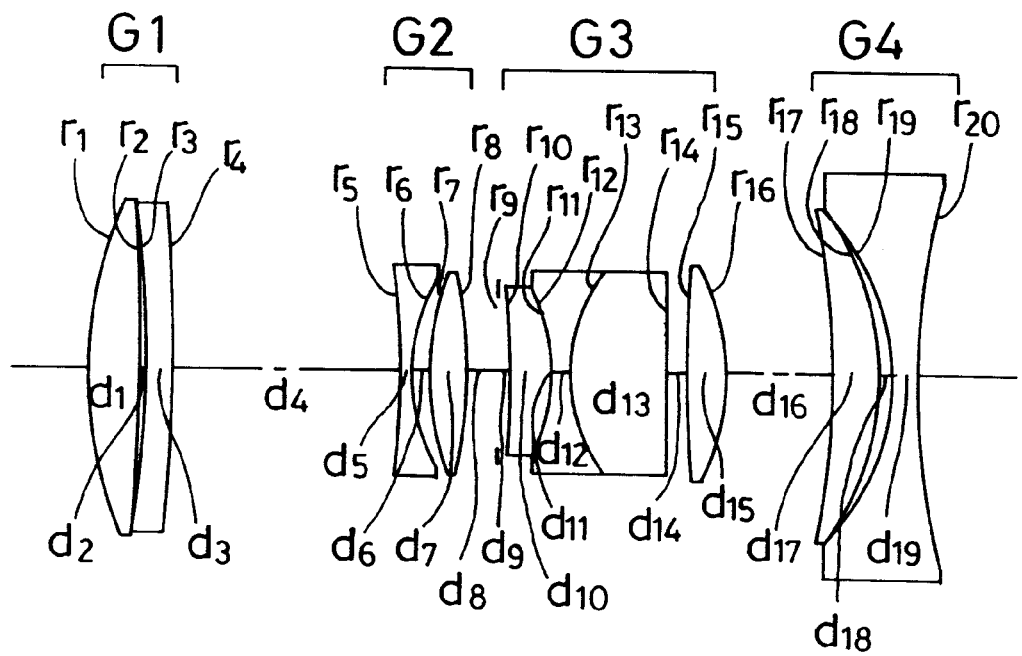
FIG. 3 is a sectional schematic of Example 3 of the zoom lens system of the invention at an intermediate focal length thereof.
Figure 4:
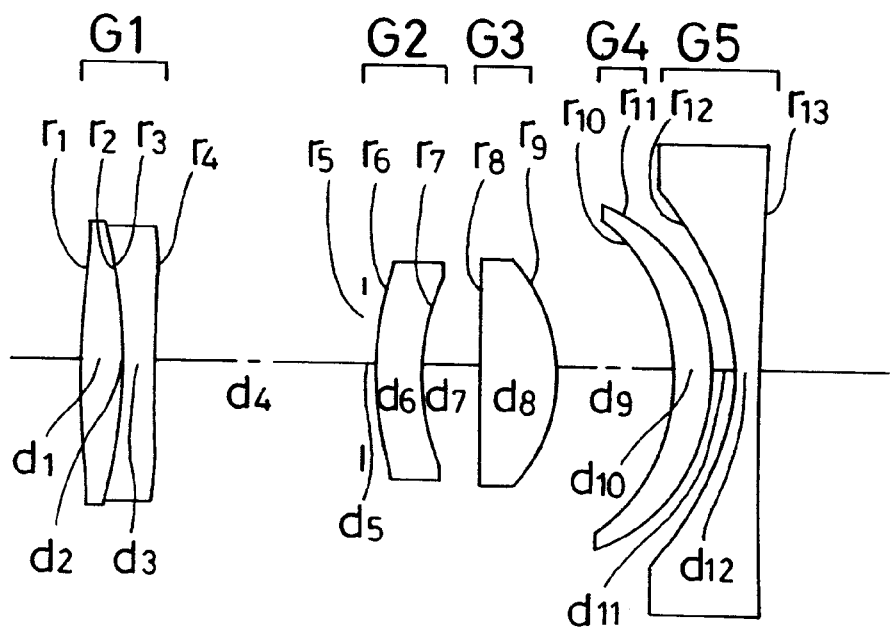
FIG. 4 is a sectional schematic of Example 4 of the zoom lens system of the invention at an intermediate focal length thereof.
Figure 5:
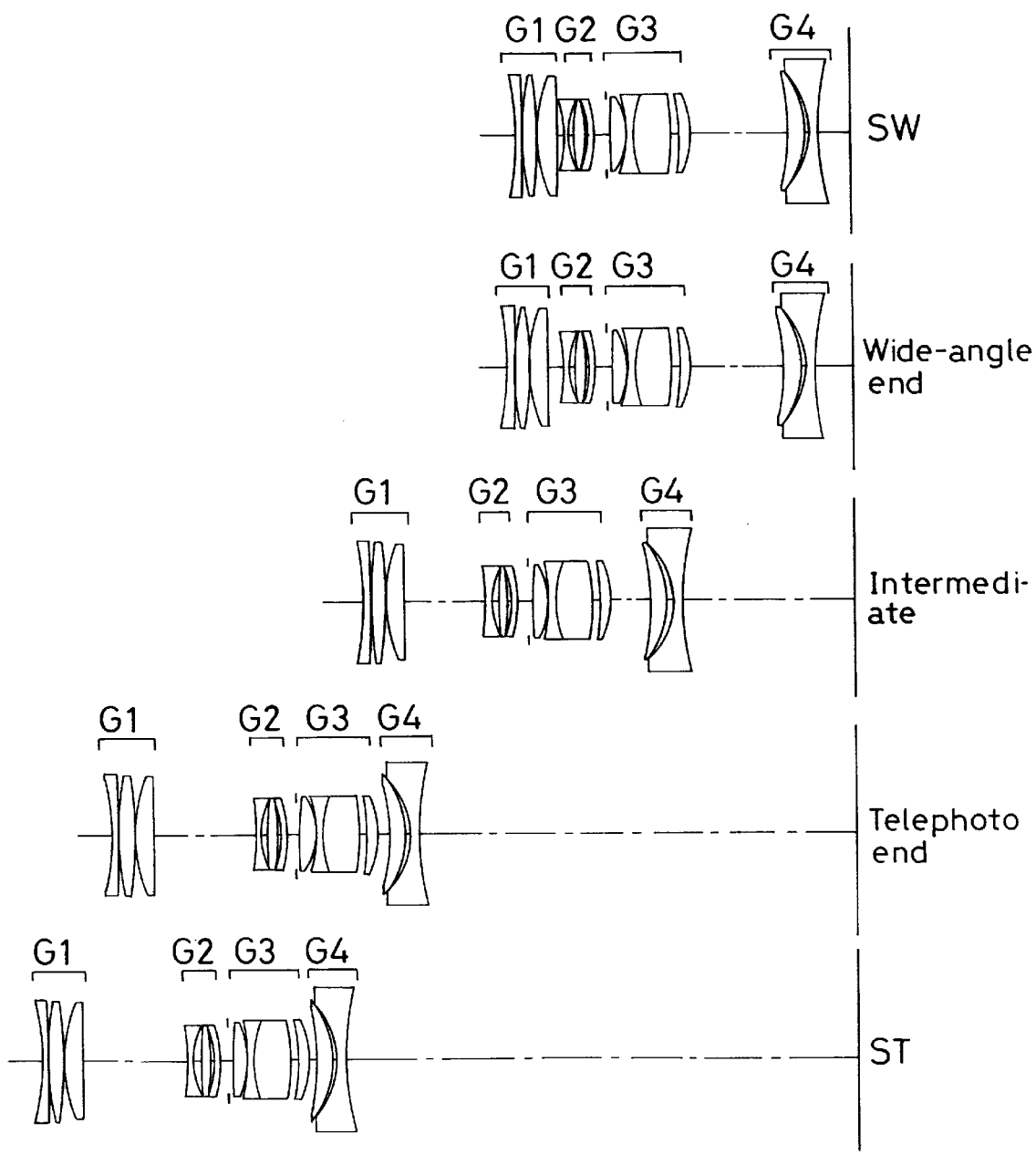
FIG. 5 illustrates the relative positions of lens groups in Example 1 on an optical axis thereof.
Figure 6:
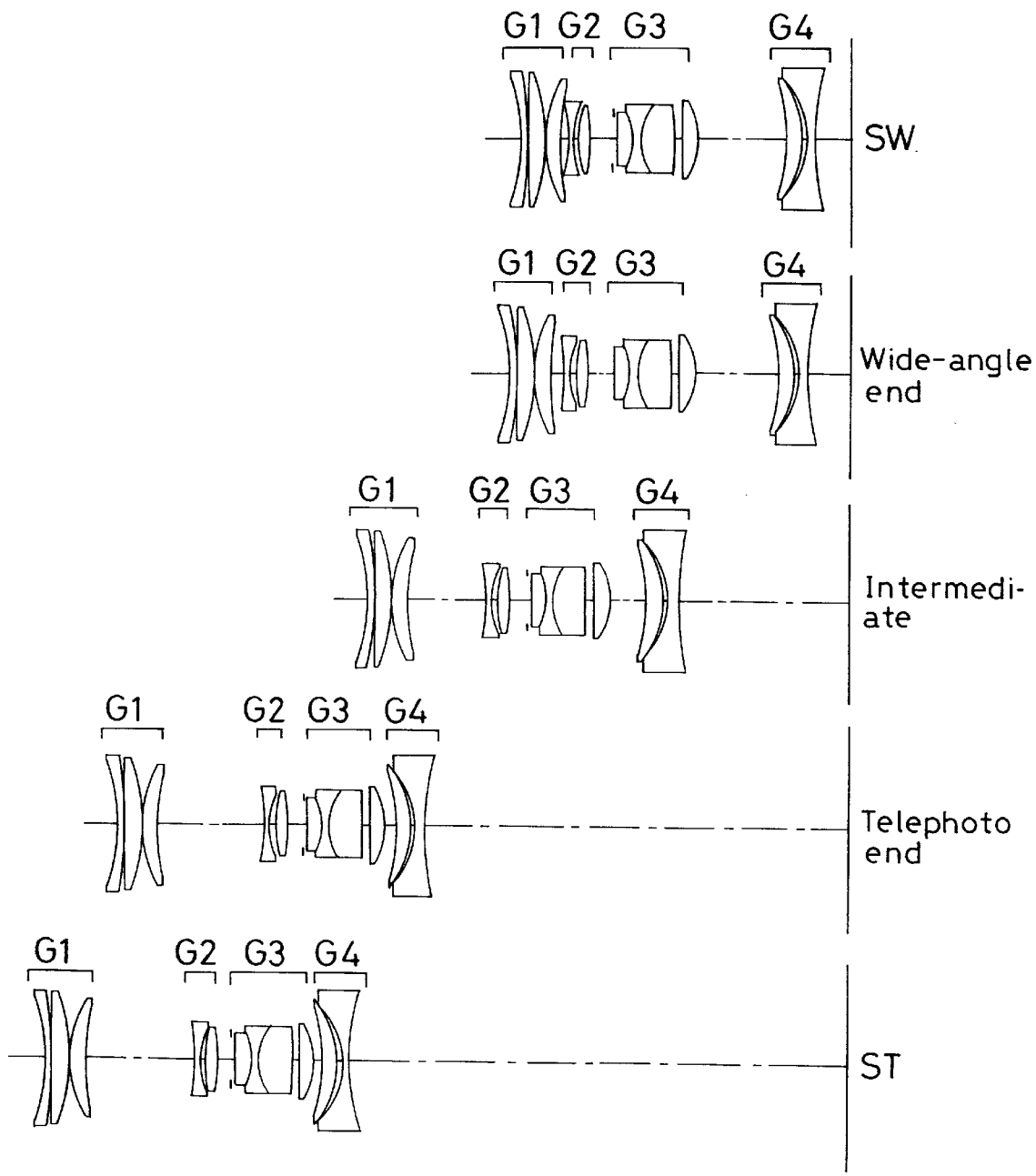
FIG. 6 illustrates the relative positions of lens groups in Example 2 on an optical axis thereof.

Example 3 is directed to a zoom lens system having a focal length of 38.9 to 166.48 and an F-number of 3.3 to 10.13. As illustrated in FIG. 3, the zoom lens system is made up of a first positive lens group G1, a second negative lens group G2, a third positive lens group G3 and a fourth negative lens group G4. The first lens group G1 is made up of a double-convex lens and a negative meniscus lens concave on an object side thereof, and the second lens group G2 is made up of a double-concave lens and a double-convex lens. The third lens group G3 is made up of an aperture stop, a positive meniscus lens convex on an image plane side thereof, a doublet consisting of a double-concave lens and a positive meniscus lens convex on an object side thereof, and a double-convex lens. The fourth lens group G4 is made up of a positive meniscus lens convex on an image plane side thereof and a double-concave lens. Six aspherical surfaces are used, one for a surface of the double-convex lens in the first lens group G1, which surface is located on an image plane side thereof, one for a surface of the negative meniscus lens in the first lens group G1, which surface is located on an image plane side thereof, one for a surface in the second lens group G2, which surface is located nearest to an image plane side thereof, one for a surface of the positive meniscus lens in the third lens group G3, which surface is proximate to the aperture stop and located on an image plane side thereof, one for a surface of the doublet in the third lens group G3, which surface is located nearest to the image plane side, and one for a surface of the double-concave lens in the fourth lens group G4, which surface is located on an object side thereof. For continuous zooming from a wide-angle end to a telephoto end via an intermediate focal length of the system, the lens groups G1 to G4 moves toward the object side, as can be seen from the numerical data, given later, and FIG. 7. At an extended wide-angle end SW, a focal length of 36.77 and an F-number of 3.2 are obtained by narrowing a first zooming space $d_4$ and widening a third zooming space $d_{16}$ from a wide-angle end position of the system. At an extended telephoto end ST, a focal length of 185 and an F-number of 11.16 are obtained by widening the first zooming space $d_4$ and narrowing a second zooming space $d_8$ from a telephoto end position of the system. In this example, the first lens group G1 consists of two lenses, a positive lens and a negative lens.

Figure 7:
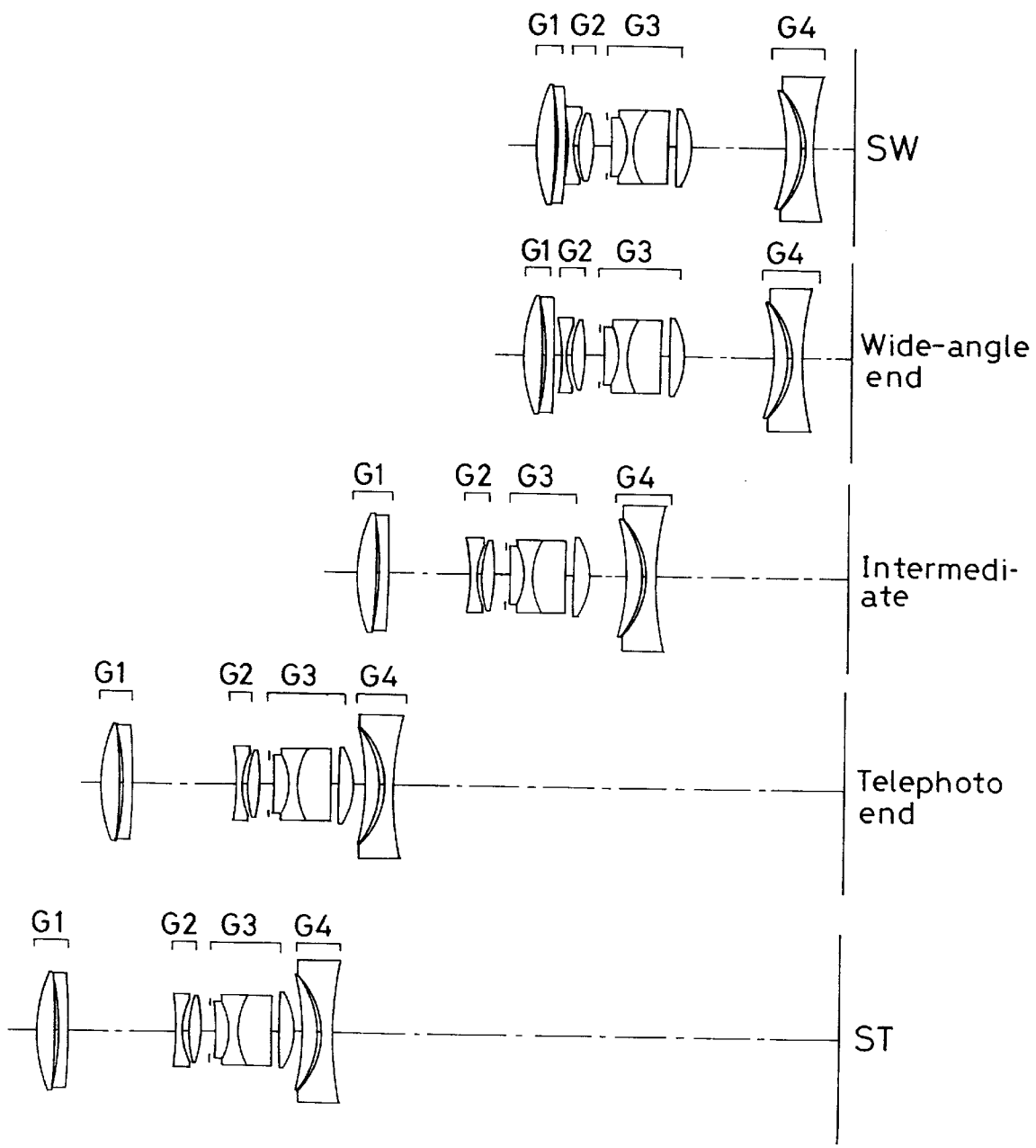
FIG. 7 illustrates the relative positions of lens groups in Example 3 on an optical axis thereof.
Figure 8:
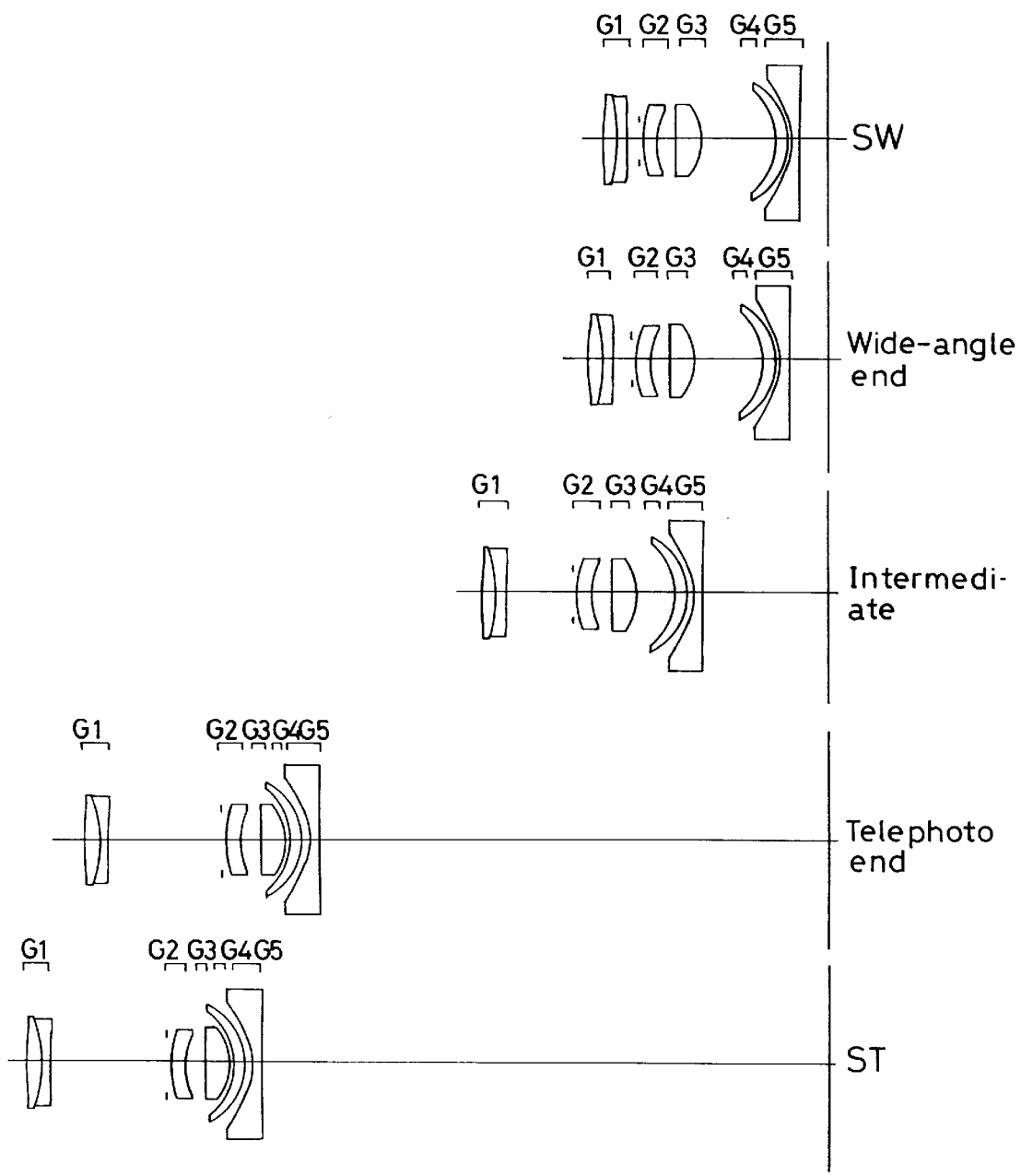
FIG. 8 illustrates the relative positions of lens groups in Example 4 on an optical axis thereof.
Figure 9A:
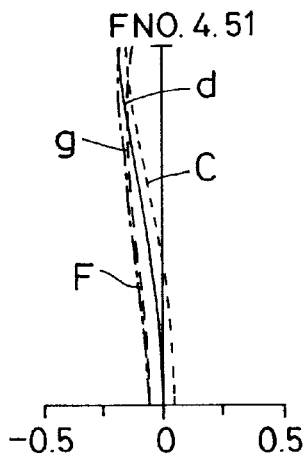
FIGS. 9(a), 9(b) and 9(c) are aberration diagrams of Example 1 at a wide-angle end thereof.
Figure 9B:
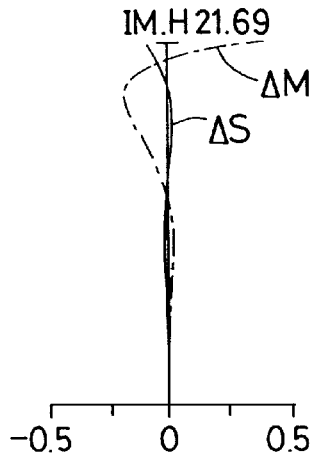
Figure 9C:
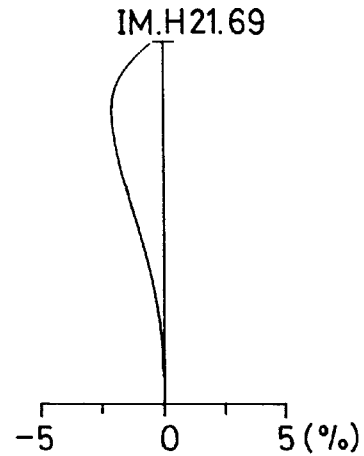
Figure 10A:
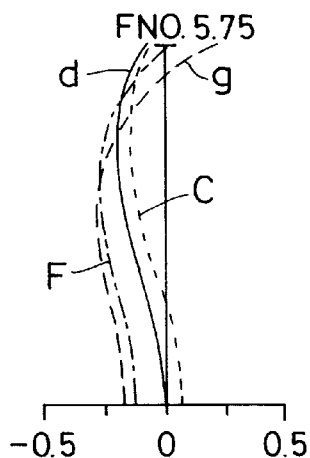
FIGS. 10(a), 10(b) and 10(c) are aberration diagrams of Example 1 at an intermediate focal length thereof.
Figure 10B:
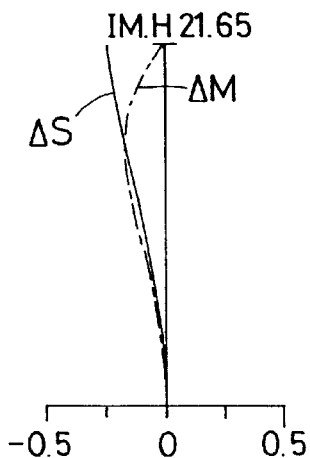
Figure 10C:
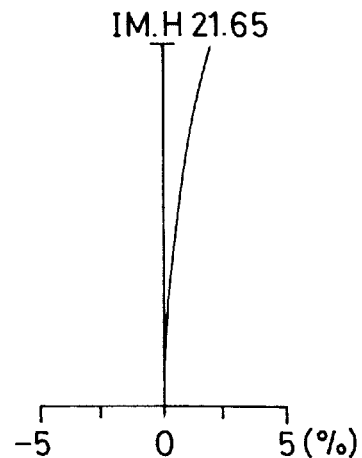
Figure 11A:
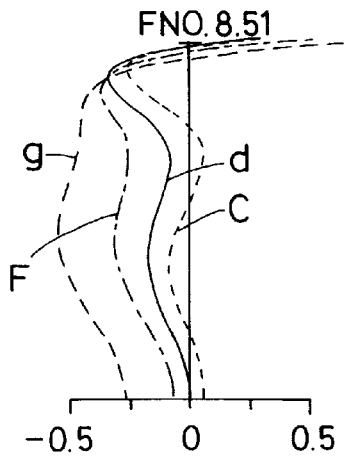
FIGS. 11(a), 11(b) and 11(c) are aberration diagrams of Example 1 at a telephoto end thereof.
Figure 11B:
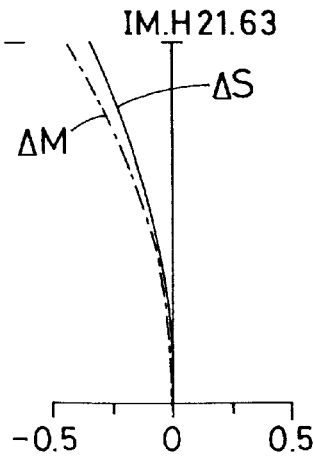
Figure 11C:
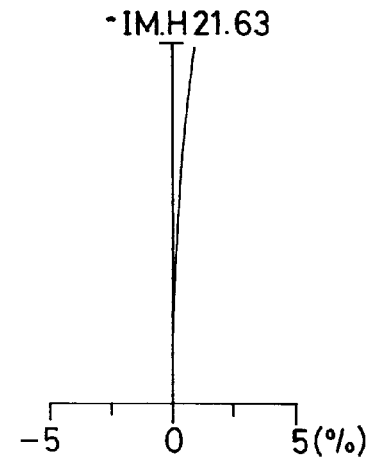
Figure 12A:
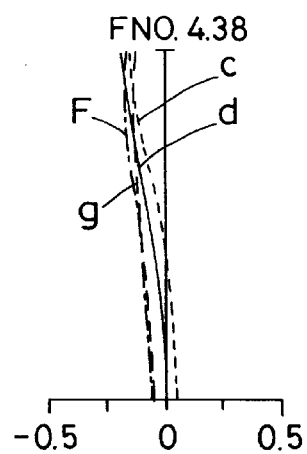
FIGS. 12(a), 12(b) and 12(c) are aberration diagrams of Example 1 at an extended wide-angle end thereof.
Figure 12B:
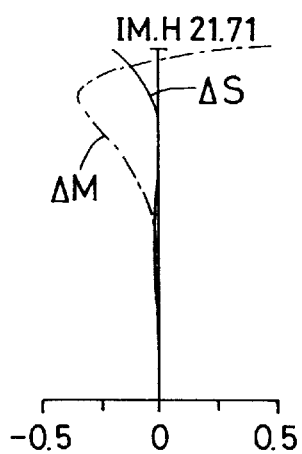
Figure 12C:
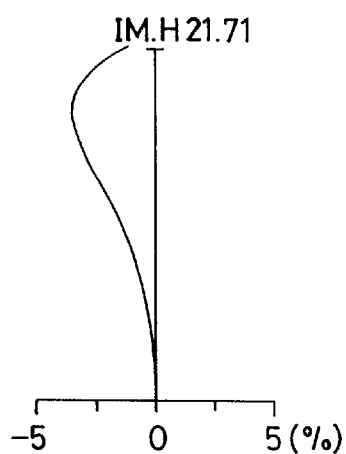
Figure 13A:
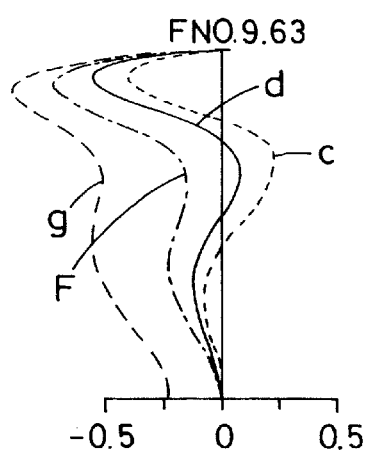
FIGS. 13(a), 13(b) and 13(c) are aberration diagrams of Example 1 at an extended telephoto end thereof.
Figure 13B:
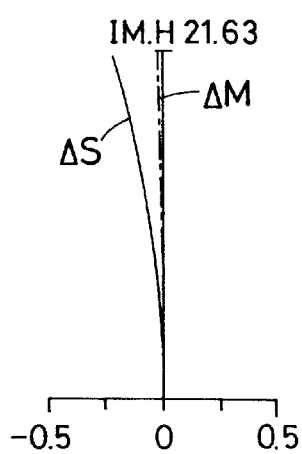
Figure 13C:
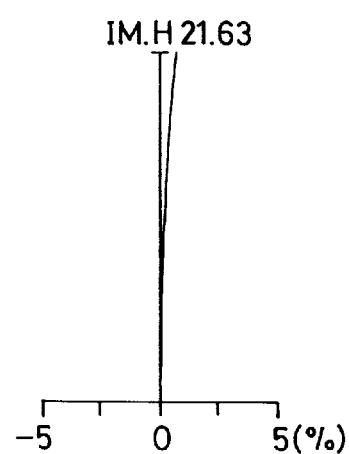

Example 4 is directed to a zoom lens system having a focal length of 38.95 to 175.37 and an F-number of 4.5 to 10.66. As illustrated in FIG. 7, the zoom lens system is made up of a first positive lens group G1, a second negative lens group G2, a third positive lens group G3, a fourth positive lens group G4 and a fifth negative lens group G5. The first lens group G1 is made up of a double-convex lens and a negative meniscus lens concave on an object side thereof, and the second lens group G2 is made up of an aperture stop and a negative meniscus lens convex on an object side thereof. The third lens group G3 is made up of a double-convex lens, the fourth lens group G4 is made up of a positive meniscus lens convex on an image plane side thereof, and the fifth lens group G5 is made up of a double-concave lens. Seven aspherical surfaces are used, one for a surface of the double-convex lens in the first lens group G1, which surface is located on an object side thereof, one for a surface of the negative meniscus lens in the first lens group G1, which surface is located on an image plane side thereof, one for a surface of the negative meniscus lens in the second lens group G2, which surface is located on the object side thereof, two for both surfaces of the double-convex lens in the third lens group G3, one for a surface of the positive meniscus lens in the fourth lens group G3, which surface is located on an object side thereof, and one for a surface of the double-concave lens in the fifth lens group G5, which surface is located on an object side thereof. For continuous zooming from a wide-angle end to a telephoto end via an intermediate focal length of the system, the lens groups G1 to G5 move toward the object side of the system, as can be seen from the numerical data, given later, and FIG. 8. At an extended wide-angle end SW, a focal length of 36.10 and an F-number of 4.16 are obtained by narrowing a first zooming space $d_4$ and a second zooming space $d_7$, widening a third zooming space $d_9$ and narrowing a fourth zooming space $d_{11}$ from a wide-angle end position of the system. At an extended telephoto end ST, a focal length of 191.85 and an F-number of 11.66 are obtained by widening the first zooming space $d_4$ and the second zooming space $d_7$, narrowing the third zooming space $d_9$ and widening the fourth zooming space $d_{11}$ from a telephoto end position of the system. This example is an extension of Examples 1 to 3, which is tantamount to an embodiment where either the third lens group G3 or the fourth lens group G4 is divided into two sub-groups.

As can be understood from Example 4, the idea of the invention may also be applied to a zoom lens system which comprises an increased number of lenses, regardless of how powers are allocated to lens groups. Especially, it is possible to achieve a zoom lens system which comprises a first positive lens group G1, a second negative lens group G2, a third positive lens group G3 and a fourth negative lens group G4, and further includes at least one separate lens group located somewhere between the first lens group and the image side. Preferably but not exclusively, this separate lens group is positioned between the second lens group G2 and the third lens group G3 or between the third lens group G3 and the fourth lens group G4. The added lens group may then have positive or negative refracting power.

Enumerated below are the numerical data regarding each example. Symbols hereinafter used but not hereinbefore have the following meanings.

f . . . focal length of the system, $F_{NO}$ . . . F-number, $r_1, r_2, \ldots$ radii of curvature of lens surfaces, $d_1, d_2, \ldots$ separation between adjacent lens surfaces, $n_{d1}, n_{d2}, \ldots$ d-line refractive indices of lenses, and $\nu_{d1}, \nu_{d2}, \ldots$ d-line Abbe's numbers of lenses.

Assume now that x represents an optical axis with the proviso that the direction of propagation of light is positive, and y represents a direction perpendicular to the optical axis. Then, the shape of an aspherical surface is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8$ and $A_{10}$ are fourth, sixth, eighth and tenth aspherical coefficients, respectively.

Example 1 f = 36.5497/38.9000 ~ 86.5000 ~ 176.2000/200.1500
$F_{NO}$ = 4.38/4.51 ~ 5.75 ~ 8.51/9.63

| | | | |
|---|---|---|---|
| $r_1$ = −62.78365 | $d_1$ = 1.450000 | $n_{d1}$ = 1.83400 | $\nu_{d1}$ = 37.2 |
| $r_2$ = −2512.44773 | $d_2$ = 0.100000 | | |
| $r_3$ = 74.00764 | $d_3$ = 3.150000 | $n_{d2}$ = 1.48749 | $\nu_{d2}$ = 70.2 |
| $r_4$ = −93.66424 | $d_4$ = 0.100000 | | |
| $r_5$ = 33.77924 | $d_5$ = 4.200000 | $n_{d3}$ = 1.49700 | $\nu_{d3}$ = 81.6 |
| $r_6$ = −1254.98741 | $d_6$ = (Variable) | | |
| $r_7$ = −40.42074 | $d_7$ = 1.200000 | $n_{d4}$ = 1.77250 | $\nu_{d4}$ = 49.6 |
| $r_8$ = 16.42014 | $d_8$ = 1.050000 | | |
| $r_9$ = 30.53437 | $d_9$ = 2.650000 | $n_{d5}$ = 1.84666 | $\nu_{d5}$ = 23.8 |
| $r_{10}$ = −31.61984 | $d_{10}$ = 0.770000 | | |
| $r_{11}$ = −19.24809 | $d_{11}$ = 1.150000 | $n_{d6}$ = 1.61772 | $\nu_{d6}$ = 49.8 |
| $r_{12}$ = −25.76696 | $d_{12}$ = (Variable) | | |

-continued

Example 1 f = 36.5497/38.9000 ~ 86.5000 ~ 176.2000/200.1500
$F_{NO}$ = 4.38/4.51 ~ 5.75 ~ 8.51/9.63

| | | | |
|---|---|---|---|
| $r_{13}$ = ∞ (Stop) | $d_{13}$ = 0.750000 | | |
| $r_{14}$ = 125.88236 | $d_{14}$ = 3.450000 | $n_{d7}$ = 1.53996 | $\nu_{d7}$ = 59.5 |
| $r_{15}$ = −16.49758 (Aspheric) | $d_{15}$ = 0.100000 | | |
| $r_{16}$ = −25.07421 | $d_{16}$ = 1.200000 | $n_{d8}$ = 1.80518 | $\nu_{d8}$ = 25.4 |
| $r_{17}$ = 20.92933 | $d_{17}$ = 8.150000 | $n_{d9}$ = 1.56384 | $\nu_{d9}$ = 60.7 |
| $r_{18}$ = −48.64432 (Aspheric) | $d_{18}$ = 1.534000 | | |
| $r_{19}$ = −57.11111 | $d_{19}$ = 2.650000 | $n_{d10}$ = 1.72916 | $\nu_{d10}$ = 54.7 |
| $r_{20}$ = −18.51630 | $d_{20}$ = (Variable) | | |
| $r_{21}$ = −45.46824 | $d_{21}$ = 3.600000 | $n_{d11}$ = 1.84666 | $\nu_{d11}$ = 23.8 |
| $r_{22}$ = −19.79729 | $d_{22}$ = 1.128000 | | |
| $r_{23}$ = −15.44019 (Aspheric) | $d_{23}$ = 1.600000 | $n_{d12}$ = 1.77250 | $\nu_{d12}$ = 49.6 |
| $r_{24}$ = 57.74058 | | | |

Variable Spaces f = 36.5497/38.9000 ~ 86.5000 ~ 176.2000/200.1500
$d_6$ = 1.28716/3.25000 ~ 17.22000 ~ 21.65820/21.79915
$d_{12}$ = 2.60928/2.60928 ~ 2.37114 ~ 2.01900/1.79018
$d_{20}$ = 20.94514/19.91214 ~ 8.40527 ~ 2.15425/1.45000

Aspherical Coefficients

15th surface

K = 0
$A_4$ = 0.323999 × 10$^{-4}$
$A_6$ = 0.267357 × 10$^{-7}$
$A_8$ = −0.105591 × 10$^{-8}$
$A_{10}$ = 0.900554 × 10$^{-11}$

18th surface

K = 0
$A_4$ = 0.289739 × 10$^{-6}$
$A_6$ = 0.497211 × 10$^{-7}$
$A_8$ = −0.952729 × 10$^{-9}$
$A_{10}$ = 0.548039 × 10$^{-11}$

23ed surface

K = 0
$A_4$ = 0.257790 × 10$^{-4}$
$A_6$ = 0.780060 × 10$^{-7}$
$A_8$ = −0.150330 × 10$^{-9}$
$A_{10}$ = 0.179150 × 10$^{-11}$

Example 2 f = 36.5500/38.9000 ~ 85.7945 ~ 176.1791/200.1506
$F_{NO}$ = 3.52/3.64 ~ 6.17 ~ 11.18/12.61

| | | | |
|---|---|---|---|
| $r_1$ = −40.75595 | $d_1$ = 1.450000 | $n_{d1}$ = 1.74950 | $\nu_{d1}$ = 35.3 |
| $r_2$ = −81.60634 | $d_2$ = 0.100000 | | |
| $r_3$ = 1366.43229 | $d_3$ = 3.600000 | $n_{d2}$ = 1.49700 | $\nu_{d2}$ = 81.6 |
| $r_4$ = −42.87094 | $d_4$ = 0.100000 | | |
| $r_5$ = 26.03176 | $d_5$ = 3.500000 | $n_{d3}$ = 1.49700 | $\nu_{d3}$ = 81.6 |
| $r_6$ = 54.32586 | $d_6$ = (Variable) | | |
| $r_7$ = −40.33227 | $d_7$ = 1.200000 | $n_{d4}$ = 1.74400 | $\nu_{d4}$ = 44.8 |
| $r_8$ = 16.97173 | $d_8$ = 1.050000 | | |
| $r_9$ = 26.07554 | $d_9$ = 2.650000 | $n_{d5}$ = 1.84666 | $\nu_{d5}$ = 23.8 |
| $r_{10}$ = −43.90229 (Aspheric) | $d_{10}$ = (Variable) | | |
| $r_{11}$ = ∞ (Stop) | $d_{11}$ = 0.750000 | | |
| $r_{12}$ = 204.25358 | $d_{12}$ = 3.450000 | $n_{d6}$ = 1.48749 | $\nu_{d6}$ = 70.2 |
| $r_{13}$ = −11.38989 (Aspheric) | $d_{13}$ = 0.100000 | | |
| $r_{14}$ = −13.73086 | $d_{14}$ = 1.200000 | $n_{d7}$ = 1.80100 | $\nu_{d7}$ = 35.0 |
| $r_{15}$ = 11.29168 | $d_{15}$ = 7.500000 | $n_{d8}$ = 1.65160 | $\nu_{d8}$ = 58.5 |
| $r_{16}$ = −93.46173 (Aspheric) | $d_{16}$ = 1.534000 | | |

-continued

Example 2

$f = 36.5500/38.9000 \sim 85.7945 \sim 176.1791/200.1506$
$F_{NO} = 3.52/3.64 \sim 6.17 \sim 11.18/12.61$

| | | | |
|---|---|---|---|
| $r_{17} = 344.96551$ | $d_{17} = 3.500000$ | $n_{d9} = 1.67790$ | $v_{d9} = 55.3$ |
| $r_{18} = -15.82079$ | $d_{18} = $ (Variable) | | |
| $r_{19} = -42.07497$ | $d_{19} = 3.600000$ | $n_{d10} = 1.84666$ | $v_{d10} = 23.8$ |
| $r_{20} = -19.64084$ | $d_{20} = 1.128000$ | | |
| $r_{21} = -15.40855$ (Aspheric) | $d_{21} = 1.600000$ | $n_{d11} = 1.77250$ | $v_{d11} = 49.6$ |
| $r_{22} = 56.68411$ | | | |

Variable Spaces $f = 36.5500/38.9000 \sim 85.7945 \sim 176.1791/200.1506$
$d_6 = 1.41703/3.25000 \sim 17.22000 \sim 22.77715/23.08225$
$d_{10} = 4.93941/4.93941 \sim 3.85795 \sim 3.28381/3.17553$
$d_{18} = 19.04854/18.13145 \sim 7.96233 \sim 2.12400/1.45000$ Aspherical Coefficients 10th surface $K = 0$
$A_4 = -0.309596 \times 10^{-5}$
$A_6 = 0.111174 \times 10^{-6}$
$A_8 = -0.308077 \times 10^{-8}$
$A_{10} = 0.334129 \times 10^{-10}$ 13th surface $K = 0$
$A_4 = 0.692497 \times 10^{-4}$
$A_6 = 0.557752 \times 10^{-6}$
$A_8 = -0.705724 \times 10^{-8}$
$A_{10} = 0.148072 \times 10^{-9}$ 16th surface $K = 0$
$A_4 = 0.685988 \times 10^{-5}$
$A_6 = 0.467360 \times 10^{-7}$
$A_8 = -0.220779 \times 10^{-8}$
$A_{10} = 0.773062 \times 10^{-11}$ 21st surface $K = 0$
$A_4 = 0.257790 \times 10^{-4}$
$A_6 = 0.780060 \times 10^{-7}$
$A_8 = -0.150330 \times 10^{-9}$
$A_{10} = 0.179150 \times 10^{-11}$

Example 3

$f = 36.7699/38.8997 \sim 86.4994 \sim 166.4784/184.9965$
$F_{NO} = 3.20/3.30 \sim 5.77 \sim 10.13/11.16$

| | | | |
|---|---|---|---|
| $r_1 = 30.67659$ | $d_1 = 4.000000$ | $n_{d1} = 1.48749$ | $v_{d1} = 70.2$ |
| $r_2 = -218.83084$ (Aspheric) | $d_2 = 0.770000$ | | |
| $r_3 = -85.57688$ | $d_3 = 1.700000$ | $n_{d2} = 1.84666$ | $v_{d2} = 23.8$ |
| $r_4 = -194.50118$ (Aspheric) | $d_4 = $ (Variable) | | |
| $r_5 = -41.82721$ | $d_5 = 1.200000$ | $n_{d3} = 1.78800$ | $v_{d3} = 47.4$ |
| $r_6 = 15.33153$ | $d_6 = 1.050000$ | | |
| $r_7 = 21.04459$ | $d_7 = 2.650000$ | $n_{d4} = 1.84666$ | $v_{d4} = 23.8$ |
| $r_8 = -40.71156$ (Aspheric) | $d_8 = $ (Variable) | | |
| $r_9 = \infty$ (Stop) | $d_9 = 0.750000$ | | |
| $r_{10} = -123.87517$ | $d_{10} = 3.450000$ | $n_{d5} = 1.49700$ | $v_{d5} = 81.6$ |
| $r_{11} = -11.00113$ (Aspheric) | $d_{11} = 0.100000$ | | |
| $r_{12} = -12.93161$ | $d_{12} = 1.200000$ | $n_{d6} = 1.80349$ | $v_{d6} = 30.4$ |
| $r_{13} = 11.98236$ | $d_{13} = 7.500000$ | $n_{d7} = 1.69680$ | $v_{d7} = 55.5$ |
| $r_{14} = 1560.56224$ (Aspheric) | $d_{14} = 1.534000$ | | |
| $r_{15} = 104.00739$ | $d_{15} = 3.500000$ | $n_{d8} = 1.70000$ | $v_{d11} = 48.1$ |

-continued

Example 3

$f = 36.7699/38.8997 \sim 86.4994 \sim 166.4784/184.9965$
$F_{NO} = 3.20/3.30 \sim 5.77 \sim 10.13/11.16$

| | | | |
|---|---|---|---|
| $r_{16} = -15.47475$ | $d_{16} = $ (Variable) | | |
| $r_{17} = -59.10758$ | $d_{17} = 3.600000$ | $n_{d9} = 1.80518$ | $v_{d9} = 25.4$ |
| $r_{18} = -20.28826$ | $d_{18} = 1.128000$ | | |
| $r_{19} = -15.54446$ (Aspheric) | $d_{19} = 1.600000$ | $n_{d10} = 1.77250$ | $v_{d10} = 49.6$ |
| $r_{20} = 55.52074$ | | | |

Variable Spaces $f = 36.7699/38.8997 \sim 86.4994 \sim 166.4784/184.9965$
$d_4 = 0.52205/1.60767 \sim 17.66806 \sim 21.94833/22.37488$
$d_8 = 3.35540/3.35540 \sim 2.58760 \sim 2.20000/2.17010$
$d_{16} = 19.64420/18.67493 \sim 7.79543 \sim 2.10922/1.45000$ Aspherical Coefficients 2nd surface $K = 0$
$A_4 = -0.979950 \times 10^{-6}$
$A_6 = 0.494472 \times 10^{-8}$
$A_8 = 0.129021 \times 10^{-10}$
$A_{10} = -0.269215 \times 10^{-12}$ 4th surface $K = 0$
$A_4 = -0.859031 \times 10^{-6}$
$A_6 = -0.601175 \times 10^{-8}$
$A_8 = 0.145525 \times 10^{-10}$
$A_{10} = 0.144589 \times 10^{-12}$ 8th surface $K = 0$
$A_4 = 0.488254 \times 10^{-6}$
$A_6 = 0.244934 \times 10^{-6}$
$A_8 = -0.739528 \times 10^{-8}$
$A_{10} = 0.892442 \times 10^{-10}$ 11th surface $K = 0$
$A_4 = 0.530890 \times 10^{-4}$
$A_6 = 0.514360 \times 10^{-6}$
$A_8 = 0.158959 \times 10^{-8}$
$A_{10} = 0.406351 \times 10^{-10}$ 14th surface $K = 0$
$A_4 = 0.253360 \times 10^{-4}$
$A_6 = 0.846022 \times 10^{-7}$
$A_8 = -0.312384 \times 10^{-8}$
$A_{10} = 0.232086 \times 10^{-10}$ 19th surface $K = 0$
$A_4 = 0.257790 \times 10^{-4}$
$A_6 = 0.780060 \times 10^{-7}$
$A_8 = -0.150330 \times 10^{-9}$
$A_{10} = 0.179150 \times 10^{-11}$

Example 4

$f = 36.0953/38.9446 \sim 63.8000 \sim 175.3739/191.8467$
$F_{NO} = 4.16/4.49 \sim 5.40 \sim 10.66/11.66$

| | | | |
|---|---|---|---|
| $r_1 = 44.91466$ (Aspheric) | $d_1 = 3.000000$ | $n_{d1} = 1.60300$ | $v_{d1} = 65.6$ |
| $r_2 = -32.63899$ | $d_2 = 0.100000$ | | |
| $r_3 = -35.96943$ | $d_3 = 1.850000$ | $n_{d2} = 1.69350$ | $v_{d2} = 50.8$ |
| $r_4 = 134.90427$ (Aspheric) | $d_4 = $ (Variable) | | |
| $r_5 = \infty$ (Stop) | $d_5 = 0.700000$ | | |

-continued

Example 4 f = 36.0953/38.9446 ~ 63.8000 ~ 175.3739/191.8467
F$_{NO}$ = 4.16/4.49 ~ 5.40 ~ 10.66/11.66

| | | | |
|---|---|---|---|
| r$_6$ = 17.90907 (Aspheric) | d$_6$ = 3.000000 | n$_{d3}$ = 1.75520 | ν$_{d3}$ = 27.5 |
| r$_7$ = 13.84165 | d$_7$ = (Variable) | | |
| r$_8$ = 483.19873 (Aspheric) | d$_8$ = 5.304227 | n$_{d4}$ = 1.49700 | ν$_{d4}$ = 81.6 |
| r$_9$ = −11.42565 (Aspheric) | d$_9$ = (Variable) | | |
| r$_{10}$ = −14.69252 (Aspheric) | d$_{10}$ = 2.430000 | n$_{d5}$ = 1.84666 | ν$_{d5}$ = 23.8 |
| r$_{11}$ = −12.69256 | d$_{11}$ = (Variable) | | |
| r$_{12}$ = −13.97029 (Aspheric) | d$_{12}$ = 1.650000 | n$_{d6}$ = 1.74062 | ν$_{d6}$ = 52.8 |
| r$_{13}$ = 536.05322 | | | |

Variable Spaces f = 36.0953/38.9446 ~ 63.8000 ~ 175.3739/191.8467
d$_4$ = 2.3970/4.1060 ~ 13.9912 ~ 23.2694/23.5902
d$_7$ = 3.7250/3.8396 ~ 4.0530 ~ 4.1211/4.1261
d$_9$ = 15.458/14.3351 ~ 7.7076 ~ 0.7770/0.4209
d$_{11}$ = 0.7206/0.7700 ~ 1.5085 ~ 1.7211/1.7256

Aspherical Coefficients

1st surface

K = 0
A$_4$ = −0.465833 × 10$^{-4}$
A$_6$ = −0.194620 × 10$^{-6}$
A$_8$ = −0.513473 × 10$^{-10}$
A$_{10}$ = 0.389547 × 10$^{-12}$

4th surface

K = 0
A$_4$ = −0.554226 × 10$^{-4}$
A$_6$ = −0.165789 × 10$^{-6}$
A$_8$ = 0.392617 × 10$^{-9}$
A$_{10}$ = −0.531348 × 10$^{-13}$

6th surface

K = 0
A$_4$ = −0.681080 × 10$^{-4}$
A$_6$ = −0.787520 × 10$^{-6}$
A$_8$ = 0.953367 × 10$^{-9}$
A$_{10}$ = −0.214046 × 10$^{-9}$

8th surface

K = 0
A$_4$ = −0.310912 × 10$^{-4}$
A$_6$ = 0.601313 × 10$^{-7}$
A$_8$ = 0.856866 × 10$^{-8}$
A$_{10}$ = 0.402819 × 10$^{-10}$

9th surface

K = 0
A$_4$ = 0.190132 × 10$^{-5}$
A$_6$ = 0.404817 × 10$^{-6}$
A$_8$ = 0.464082 × 10$^{-9}$
A$_{10}$ = 0

10th surface

K = 0
A$_4$ = 0.260240 × 10$^{-4}$
A$_6$ = −0.109329 × 10$^{-5}$
A$_8$ = 0.561238 × 10$^{-8}$
A$_{10}$ = −0.414424 × 10$^{-0}$

12th surface

K = 0
A$_4$ = −0.955240 × 10$^{-5}$
A$_6$ = 0.907038 × 10$^{-6}$
A$_8$ = −0.214588 × 10$^{-8}$
A$_{10}$ = 0.594011 × 10$^{-11}$

Set out below are the values of ν$_{P3}$, m$_{4T}$/m$_{4W}$, m$_{SW}$, m$_W$, m$_T$, m$_{ST}$ and f$_1$ in Examples 1 to 4. The values of the zoom ratio T/W between the wide-angle end and the telephoto end, and the values of the zoom ratio ST/SW between the extended wide-angle end and the extended telephoto end are also noted.

| | Example 1 | Example 2 | Example 3 | Example 4 |
|---|---|---|---|---|
| ν$_{P3}$ | 58.30 | 61.33 | 61.73 | — |
| m$_{4T}$/m$_{4W}$ | 3.406 | 3.346 | 3.725 | — |
| m$_{SW}$ | 0.5309 | 0.5164 | 0.3956 | 0.2807 |
| m$_W$ | 0.5651 | 0.5497 | 0.4185 | 0.3029 |
| m$_T$ | 2.5595 | 2.4894 | 1.7911 | 1.3639 |
| m$_{ST}$ | 2.9074 | 2.8281 | 1.9903 | 1.4920 |
| f$_1$ | 68.8423 | 70.7723 | 92.9499 | 128.5833 |
| T/W | 4.530 | 4.529 | 4.280 | 4.503 |
| ST/SW | 5.476 | 5.476 | 5.031 | 5.315 |

Figure 14:
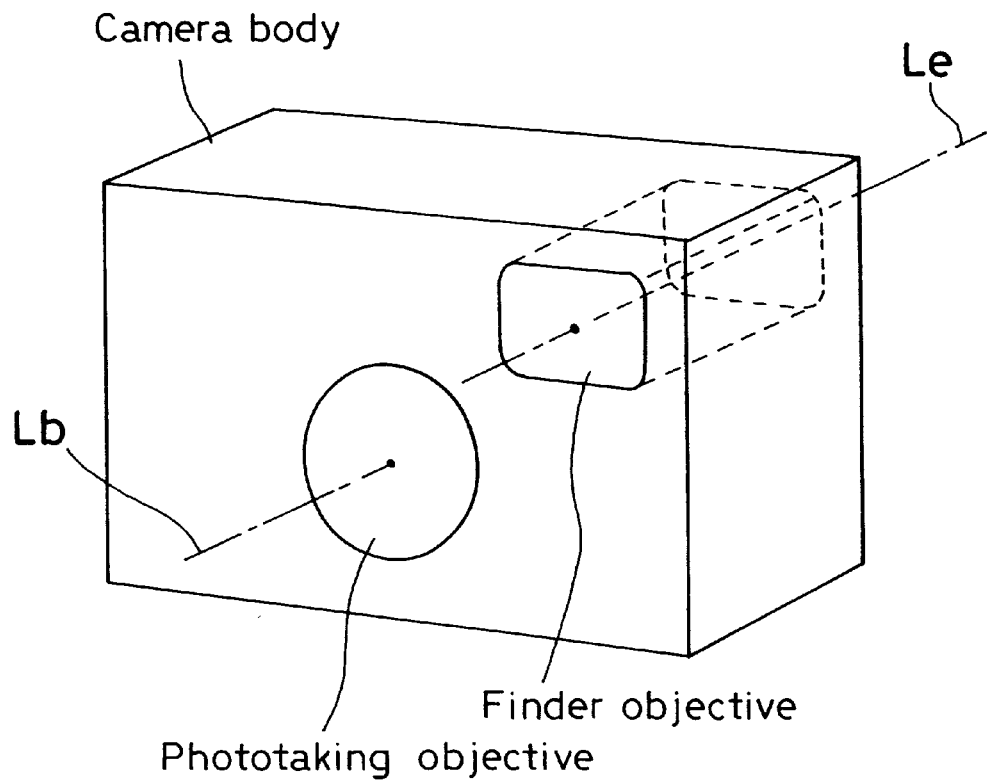
FIG. 14 is a perspective schematic of one example of a compact camera.
Figure 15:
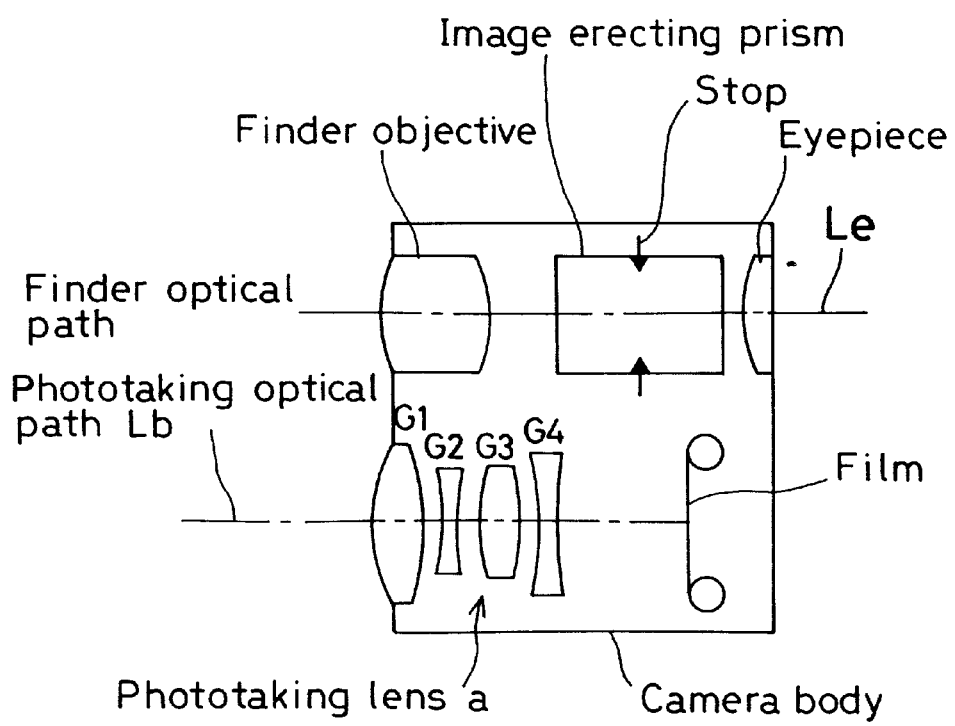
FIG. 15 is a sectional schematic of the compact camera.

The zoom lens system of the invention as explained above may be used as a phototaking objective a for a compact camera designed as typically illustrated in the perspective view of FIG. 14 and the sectional view of FIG. 15, wherein L$_b$ represents a phototaking optical path and L$_e$ a finder optical path. While the phototaking optical path L$_b$ is parallel with the finder optical path L$_e$, a subject's image is observed through a finder comprising a finder objective, an image erecting prism, a stop and an eyepiece to form the image on a film through the phototaking objective a.

The wide-angle end and telephoto end used herein are understood to refer to an end on a wide-angle side and an end on a telephoto side of an area capable of continuous zooming (a zooming area). Likewise, the extended wide-angle end is understood to refer to a zooming position located nearest to the wide-angle side, which position is selected from at least one zooming point discontinuously found in an area beyond the zooming area, and the extended telephoto end is understood to refer to a zooming position located nearest to the telephoto side, which position is selected from at least one zooming point discontinuously found in an area beyond the zooming area.

As can be appreciated from the foregoing explanation, it is possible to use the lens arrangement of the zoom lens system according to the invention and the extended wide-angle and telephoto ends, thereby covering a substantial part of the ordinary phototaking focal length range used with conventional interchangeable lenses for single-lens reflex cameras.

What is claimed is:

1. A zoom lens system comprising:

a first lens group having positive refracting power;

a second lens group disposed nearer to an image side of said zoom lens system than said first lens group and having negative refracting power;

a third lens group disposed nearer to the image side than said second lens group and having positive refracting power; and a fourth lens group disposed nearer to the image side than said third lens group and having negative refracting power, wherein for zooming from a wide-angle end to a telephoto end of a zooming area having a continuous zooming action, an intergroup space of each lens group is varied, at least one group of said four lens groups is moved to define an extended wide-angle point that is a discontinuous zooming point at a position where a focal length thereof becomes shorter than said wide-angle end of the zooming area, and at least one lens group of said four lens groups is moved to define an extended telephoto point that is a discontinuous zooming point at a position where a focal length thereof becomes longer than said telephoto end of the zooming area.

2. The zoom lens system according to claim 1, wherein the magnification ratio between the wide-angle end and the telephoto end of said zooming area is at least 4.

3. The zoom lens system according to claim 1, wherein the magnification ratio between said wide-angle point and said telephoto point is at least 5.

4. The zoom lens system according to claim 1, 2 or 3, wherein, in addition to said four lens groups, a separate lens group is positioned between said first lens group and the image side of said zoom lens system.

5. The zoom lens system according to claim 4, wherein said separate lens group is positioned between said second lens group and said third lens group.

6. The zoom lens system according to claim 4, wherein said separate lens group is positioned between said third lens group and said fourth lens group.

7. The zoom lens system according to claim 4, wherein said separate lens group has positive refracting power.

8. The zoom lens system according to claim 1, 2 or 3, wherein said second lens group comprises at least one doublet consisting of a negative lens and a positive lens.

9. The zoom lens system according to claim 1, 2 or 3, wherein said third lens group comprises a positive lens, a doublet consisting of a negative lens and a positive lens, and includes at least one aspherical surface.

10. The zoom lens system according to claim 1, 2 or 3, wherein said fourth lens group comprises at least a negative lens and a positive lens, and includes at least aspherical surface.

11. The zoom lens system according to claim 9, which satisfies the following condition:

$$\nu_{P3} > 50 \qquad (1)$$

where $\nu_{P3}$ is an average value of an Abbe's number at a reference wavelength d-line of said positive lens in said third lens group.

12. The zoom lens system according to claim 10, which satisfies the following condition:

$$2 < m_{4T}/m_{4W} < 6 \qquad (2)$$

where $m_{4T}$ is a transverse magnification of said fourth lens group at said telephoto end, and $m_{4W}$ is a transverse magnification of said fourth lens group at said wide-angle end.

13. A zoom lens system comprising, in order from an object side of aid zoom lens system:
 a first lens group having positive refracting power;
 a second lens group having negative refracting power;
 a third lens group having positive refracting power; and
 a fourth lens group having negative refracting power,
 wherein for zooming from a wide-angle end to a telephoto end of said zoom lens system, each lens groups moves toward said object side, and a focal length shorter than said wide-angle end is obtained by varying at least two of zooming spaces $D_{1W}$, $D_{2W}$ and $D_{3W}$ while a focal length longer than said telephoto end is obtained by varying at least two of zooming spaces $D_{1T}$, $D_{2T}$ and $D_{3T}$,
 wherein $D_{1W}$ is a first zooming space at said wide-angle end, $D_{2W}$ is a second zooming space at said wide-angle end, $D_{3W}$ is a third zooming space at said wide-angle end, $D_{1T}$ is a first zooming space at said telephoto end, $D_{2T}$ is a second zooming space at said telephoto end, and $D_{3T}$ is a third zooming space at said telephoto end.

14. A camera device comprising:
 a viewing optical system having an objective, an image erecting system and an eyepiece; and
 a phototaking optical system with an optical axis thereof being different from that of said viewing optical system,
 wherein said phototaking optical system comprises a zoom lens system according to claim 1, 2 or 3.

15. A camera device comprising:
 a viewing optical system having an objective, an image erecting system and an eyepiece; and
 a phototaking optical system with an optical axis thereof being different from that of said viewing optical system,
 wherein said phototaking optical system comprises a zoom lens system according to claim 13.

16. A zoom lens system comprising:
 a first lens group having positive refracting power;
 a second lens group disposed nearer to an image side of the system than the first lens group and having negative refracting power;
 a third lens group disposed nearer to the image side than the second lens group and having positive refracting power; and
 a fourth lens group disposed nearer to the image side than the third lens group and having negative refracting power,
 wherein an intergroup space of at least one lens group of said four lens groups is varied for zooming,
 a magnification ratio between a zooming point located nearest to a wide-angle side and a zooming point located nearest to a telephoto side in a zooming range of said zoom lens system is at least 5, and
 in addition to said four lens groups, a separate lens group is positioned between said first lens group and the image side of aid zoom lens system.

17. The zoom lens system according to claim 16, wherein said, separate lens group is positioned between said second lens group and said third lens group.

18. The zoom lens system according to claim 16, wherein said separate lens group is positioned between said third lens group and said fourth lens group.

19. The zoom lens system according to claim 16, wherein said separate lens group has positive refracting power.

20. The zoom lens system according to claim 1, 2, 3, 16, 17, 18 or 19, wherein said first lens group comprises at least one doublet consisting of a negative lens and a positive lens.

21. The zoom lens system according to claim 4, wherein said first lens group comprises at least one doublet consisting of a negative lens and a positive lens.

22. The zoom lens system according to claim 5, wherein said first lens group comprises at least one doublet consisting of a negative lens and a positive lens.

23. The zoom lens system according to claim 6, wherein said first lens group comprises at least one doublet consisting of a negative lens and a positive lens.

24. The zoom lens system according to claim 7, wherein said first lens group comprises at least one doublet consisting of a negative lens and a positive lens.

25. The zoom lens system comprising:
 a first lens group having positive refracting power;
 a second lens group disposed nearer to an image side of the system than the first lens group and having negative refracting power;
 a third lens group disposed nearer to the image side than the second lens group and having positive refracting power; and a fourth lens group disposed nearer to the image side than the third lens group and having negative refracting power, wherein an intergroup space of at least one lens group of said four lens groups is varied for zooming, a magnification ratio between a zooming point located nearest to a wide-angle side and a zooming point located nearest to a telephoto side in a zooming range of said zoom lens system is at least 5, and said second lens group comprises at least one doublet consisting of a negative lens and a positive lens.

26. A zoom lens system comprising:

a first lens group having positive refracting power;

a second lens group disposed nearer to an image side of the system than the first lens group and having negative refracting power;

a third lens group disposed nearer to the image side than the second lens group and having positive refracting power; and a fourth lens group disposed nearer to the image side than the third lens group and having negative refracting power, wherein an intergroup space of at least one lens group of said four lens groups is varied for zooming;

a magnification ratio between a zooming point located nearest to a wide-angle side and a zooming point located nearest to a telephoto side in a zooming range of said zoom lens system is at least 5, and said third lens group comprises a positive lens, a doublet consisting of a negative lens and a positive lens and a positive lens, and includes at least one aspherical surface.

27. A zoom lens system comprising:

a first lens group having positive refracting power;

a second lens group disposed nearer to an image side of the system than the first lens group and having negative refracting power;

a third lens group disposed nearer to the image side than the second lens group and having positive refracting power; and a fourth lens group disposed nearer to the image side than the third lens group and having negative refracting power, wherein an intergroup space of at least one lens group of aid four lens groups is varied for zooming, a magnification ratio between a zooming point located nearest to a wide-angle side and a zooming point located nearest to a telephoto side in a zooming range of said zoom lens system is at least 5, and said fourth lens group comprises at least a negative lens and a positive lens, and includes at least one aspherical surface.

28. The zoom lens system according to claim 26, which satisfies the following condition:

$$v_{P3} > 50 \quad (1)$$

where $v_{P3}$ is an average value of an Abbe's number at a reference wavelength d-line of said positive lens in said third lens group.

29. The zoom lens system according to claim 27, which includes a zooming area having a continuous zooming action and a wide-angle end and a telephoto end of said zooming area having a continuous zooming action satisfies the following condition:

$$2 < m_{4T}/m_{4W} < 6 \quad (2)$$

where $m_{4T}$ is a transverse magnification of said fourth lens group at said telephoto end, and $m_{4W}$ is a transverse magnification of said fourth lens group at said wide-angle end.

30. A camera device comprising:

a viewing optical system including an objective, an image erecting system and an eyepiece; and a phototaking optical system with an optical axis thereof being different from that of said viewing optical system, wherein said phototaking optical system further comprises a first lens group having positive refracting power, a second lens group disposed nearer to an image side of the system than the first lens group and having negative refracting power, a third lens group disposed nearer to the image side than the second lens group and having positive refracting power, and a fourth lens group disposed nearer to the image side than the third lens group and having negative refracting power, in which an intergroup space of at least one lens group of said four lens groups is varied for zooming, and a magnification ratio between a zooming point located nearest to a wide-angle side and a zooming point located nearest to a telephoto side in a zooming range of said zoom lens system is at least 5.

31. A camera device comprising:

a viewing optical system comprising an objective, an image erecting system and an eyepiece; and a phototaking optical system with an optical axis thereof being different from that of aid viewing optical system, wherein said phototaking optical system further comprises, in order from an object side thereof, a first lens group having positive refracting power, a second lens group having negative refracting power, a third lens group having positive refracting power, and a fourth lens group having negative refracting power, in which for zooming a wide-angle end to a telephoto end of said zoom lens system, each lens group moves toward said object side with respect to said wide-angle end, said first lens group comprises at least one doublet consisting of a negative lens and a positive lens, said second lens group comprises at least one doublet consisting of a negative lens and a positive lens, said third lens group comprises a positive lens, a doublet consisting of a negative lens and a positive lens and has at least one aspherical surface therein, and said fourth lens group comprises at least a negative lens and a positive lens and has at least one aspherical surface therein, and said zoom lens system satisfies the following conditions:

$$v_{P3} > 50 \quad (1)$$

$$2 < m_{4T}/m_{4W} < 6 \quad (2)$$

wherein $v_{P3}$ is an average value of an Abbe's number at a reference wavelength d-line of said positive lens in said third lens group, $m_{4T}$ is a transverse magnification of said fourth lens group at said telephoto end, and $m_{4W}$ is a transverse magnification of said fourth lens group at said wide-angle end.

* * * * *